(12) United States Patent
Rapkin et al.

(10) Patent No.: US 7,115,056 B2
(45) Date of Patent: Oct. 3, 2006

(54) DUAL SPRING TENSIONER

(75) Inventors: Alan E. Rapkin, Pittsford, NY (US);
Richard G. Luther, Hamlin, NY (US);
Morris A. Karski, Victor, NY (US);
Steven P. Bailey, Rochester, NY (US)

(73) Assignee: Eastman Kodak Company, Rochester, NY (US)

( * ) Notice: Subject to any disclaimer, the term of this patent is extended or adjusted under 35 U.S.C. 154(b) by 289 days.

(21) Appl. No.: 09/860,007

(22) Filed: May 17, 2001

(65) Prior Publication Data
US 2001/0046913 A1   Nov. 29, 2001

Related U.S. Application Data

(60) Provisional application No. 60/205,019, filed on May 17, 2000.

(51) Int. Cl.
*F16H 7/12*   (2006.01)
*F16H 7/18*   (2006.01)

(52) U.S. Cl. .................. 474/133; 474/135; 474/117; 474/101

(58) Field of Classification Search ............ 474/133, 474/117, 101, 135, 109, 114–116, 136, 138; 348/96, 103, 199; 399/50, 174, 176
See application file for complete search history.

(56) References Cited

U.S. PATENT DOCUMENTS 4,108,013 A   8/1978   Sragal

| 4,281,557 A | 8/1981 | Ohta et al. |
| 4,530,682 A | 7/1985 | Gruber et al. |
| 4,987,428 A | 1/1991 | Bannai et al. |
| 5,176,580 A | 1/1993 | Stamm et al. |
| 5,271,742 A | 12/1993 | Mitcham |
| 5,872,591 A | 2/1999 | True et al. |
| 6,120,401 A | 9/2000 | Wilken |

FOREIGN PATENT DOCUMENTS

| DE | 38 17 176 A | | 11/1989 |
| EP | 38233 | | 10/1981 |
| EP | 0053954 A | * | 6/1982 |
| EP | 0053954 A1 | * | 6/1982 |
| EP | 0 150 893 A | | 8/1985 |
| JP | 60-47731 | * | 3/1985 |
| JP | 8-93869 | | 4/1986 |
| JP | 7-280051 | | 10/1995 |

* cited by examiner

Primary Examiner—Marcus Charles
(74) Attorney, Agent, or Firm—Donna P. Suchy

(57) ABSTRACT

A drive belt tensioning method and assembly using a dual spring tensioner. A pulley from a drive belt/pulley system is mounted onto a pivot arm having a pivot point. A tensioner spring mounts between the machine frame and the pivot arm, such that is causes rotation of the pivot arm about the pivot point in the opposite direction that the belt/pulley system causes rotation about the pivot point. A stop is used to keep the pivot arm in the position of tensioner spring/belt/pulley system equilibrium. This stop is mounted to the machine frame after the pivot arm equilibrium is reached. A retainer spring mounts between the machine frame and the pivot arm such that when in tension it causes a rotational force about the pivot point in the same direction that the tensioner spring causes a rotational force about the pivot point.

8 Claims, 4 Drawing Sheets

DUAL SPRING TENSIONER

CROSS-REFERENCE TO RELATED APPLICATIONS

This application claims the benefit of U.S. Provisional Application No. 60/205,019, filed May 17, 2000.

BACKGROUND

The present invention is in the field of drive belt tensioning. The invention is particulalry useful for drive belt tensioning in reproduction machines such as electrographic printers.

The use of timing belts requires accurate tension for proper function. Common practice is to use a spring to set the initial tension, and then to lock the tensioner in place, to prevent belt jumping under torque impulses. However, when it is necessary to move the drive points or other pulleys in the belt/pulley system, such as when paper path assemblies are opened for paper jam clearance, the drive belts can lose tension and fall off the drive points.

A tensioner is desired which can prevent belt jumping under torque impulses and prevent over tensioning, while allowing drive points and other pulleys to move if required.

SUMMARY OF THE INVENTION

According to an aspect of the invention, a dual spring tensioner for a flexible drive member in a machine is provided, comprising a pivot arm with an axis of rotation about which the pivot arm is free to pivot, wherein the pivot arm is mounted to the machine at the axis of rotation, a tensioner spring having an end one attachable to the machine frame and an end two attached to the pivot arm, a pulley cooperable with the flexible drive member and mounted to the pivot arm, a retainer spring having an end one attachable to the machine and an end two attached to the pivot arm, and a stop attachable to the machine that counters force applied to the pivot arm by the tensioner spring and the retainer spring, wherein tension in the flexible drive member is set by the tensioner spring and the stop.

According to a further aspect of the invention, a method and apparatus for tensioning a flexible drive member in a machine is provided, comprising engaging the flexible drive member with a pulley mounted on a pivot arm having an axis of rotation about which the pivot arm is free to pivot, the pivot arm being mounted to the machine at the axis of rotation, mounting a tensioner spring to the pivot arm and the machine, mounting a stop to the machine touching the pivot arm, wherein tension in the flexible drive member is set by the tensioner spring and the stop, and mounting a retainer spring to the pivot arm and the machine.

According to a still further aspect of the invention, a method and apparatus for tensioning a flexible drive member in a machine is provided, comprising tensioning the flexible drive member with a pivot arm having a pulley engaged with the flexible drive member and a tensioner spring, prohibiting the pivot arm from rotating in a direction that increases tension in the flexible drive member while allowing the pivot arm to rotate in a direction that decreases tension in the flexible drive member, and resiliently restraining the pivot arm from rotating in the direction that decreases tension in the flexible drive member with a retainer spring.

DETAILED DESCRIPTION

Figure 1:
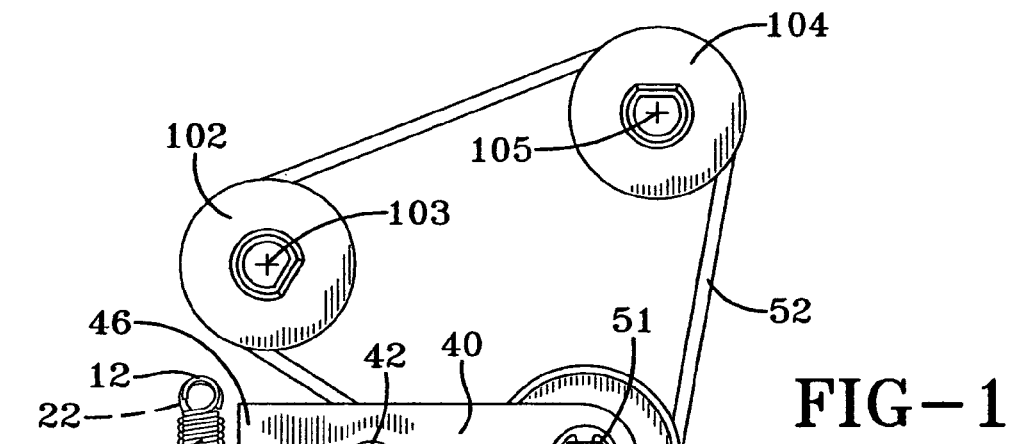
FIG. 1 is a front view of a dual spring tensioner according to an aspect of the invention.
Figure 2:
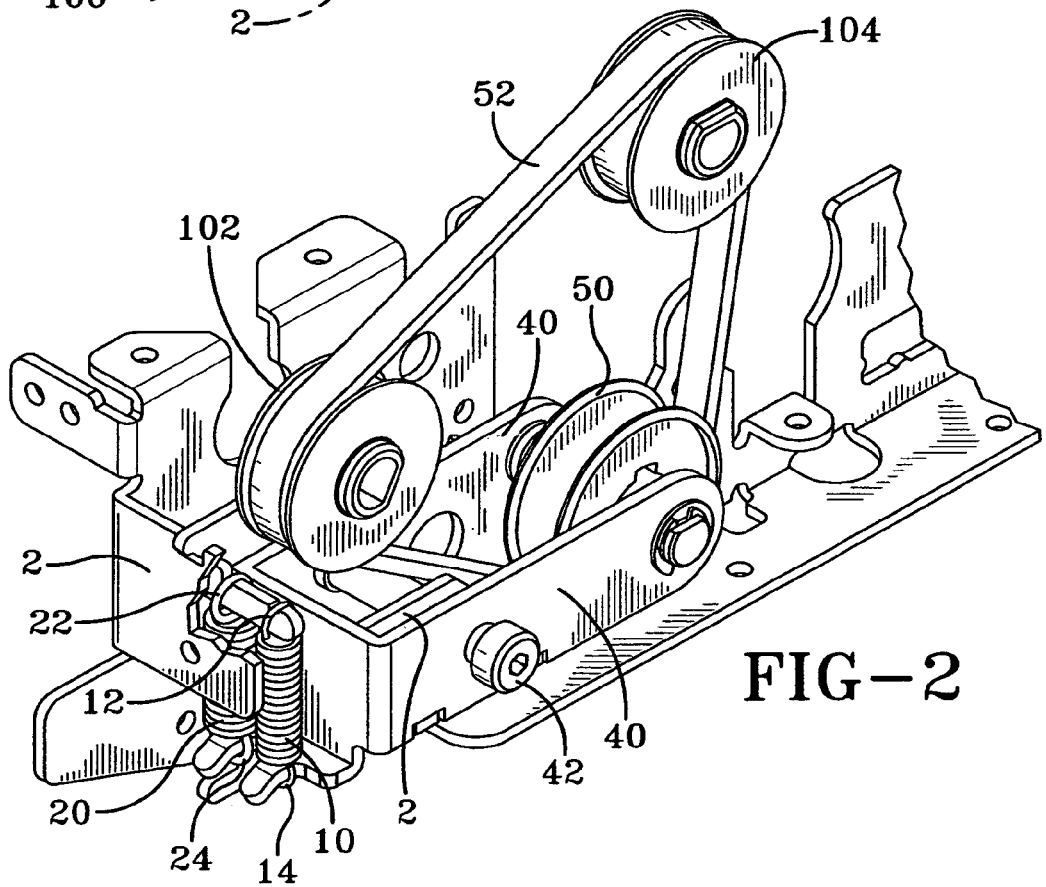
FIG. 2 is an isometric view of a dual spring tensioner according to an aspect of the invention attached to a portion of a machine.

Various aspects of the invention are presented in FIGS. 1–5 which are not drawn to scale and in which like components are numbered alike. Referring now to FIGS. 1 and 2, according to an aspect of the invention, a dual spring tensioner 100 for tensioning a flexible drive member 52 in a drive system for a machine is provided. A machine is represented in the drawings by a machine frame 2. The tensioner 100 comprises a pivot arm 40, a pulley 50 attached to the pivot arm 40, a stop 30, and a tensioner spring 10. The pivot arm 40 comprises a counter-stop 41 opposite the stop 30. The tensioner 100, as demonstrated, is part of a drive system having a pulley 102 and a pulley 104. The pulley 50 has an axis of rotation 51, the pulley 102 has an axis of rotation 103, and the pulley 104 has an axis of rotation 105. The flexible drive member 52 is a belt, chain, or similar drive, all such variations being contemplated in the practice of the invention. According to a preferred embodiment, the drive member 52 is a timing belt.

According to an aspect of the invention, the tensioner spring 10 has an end one 12 and an end two 14 wherein end one 12 is attached to a portion of a machine, represented in the drawings by a machine frame 2. The pivot arm 40 has an axis of rotation 42 about which the pivot arm 40 is free to pivot, and the pivot arm 40 is mounted to the machine at the axis of rotation 42. A pulley 50 is mounted to the pivot arm 40 and the tensioner spring end two 14 is mounted to the pivot arm 40 such that the force of the tensioner spring 10 on the pivot arm 40 causes a moment about the pivot point 42 that places a tension upon the belt 52 via pulley 50.

The stop 30 is attached to the machine, and is positioned to touch the counter-stop 41 on the pivot arm 40. This establishes a known tension in the belt 52, that is directly dependent upon the dimensions of components of the tensioner 100, the spring constant of the spring 10, and the deflection of the spring 10. Forcing the stop 30 against the counter-contact 41 during positioning of the stop 30 is preferably avoided since doing so reduces the tension in the belt 52. After the stop 30 is positioned to touch the counter-contact 41, the stop 30 is fixed relative to the machine, for example, by a fastener 34.

Thereafter, a retainer spring 20 is applied. The retainer spring 20 has an end one 22 and an end two 24, wherein the retainer spring end one 22 is attached to the machine, represented in the drawings by a machine frame 2, and the retainer spring end two 24 is attached to the pivot arm 40. According to an aspect of the invention, the spring constant of the retainer spring 20 has a magnitude sufficient to keep the pivot arm 40 pressed against the stop 30 when the machine is in operation, particularly during torque impulses. According to a particularly preferred embodiment, the retainer spring 20 has a higher spring constant than the tensioner spring 10.

Figure 3:
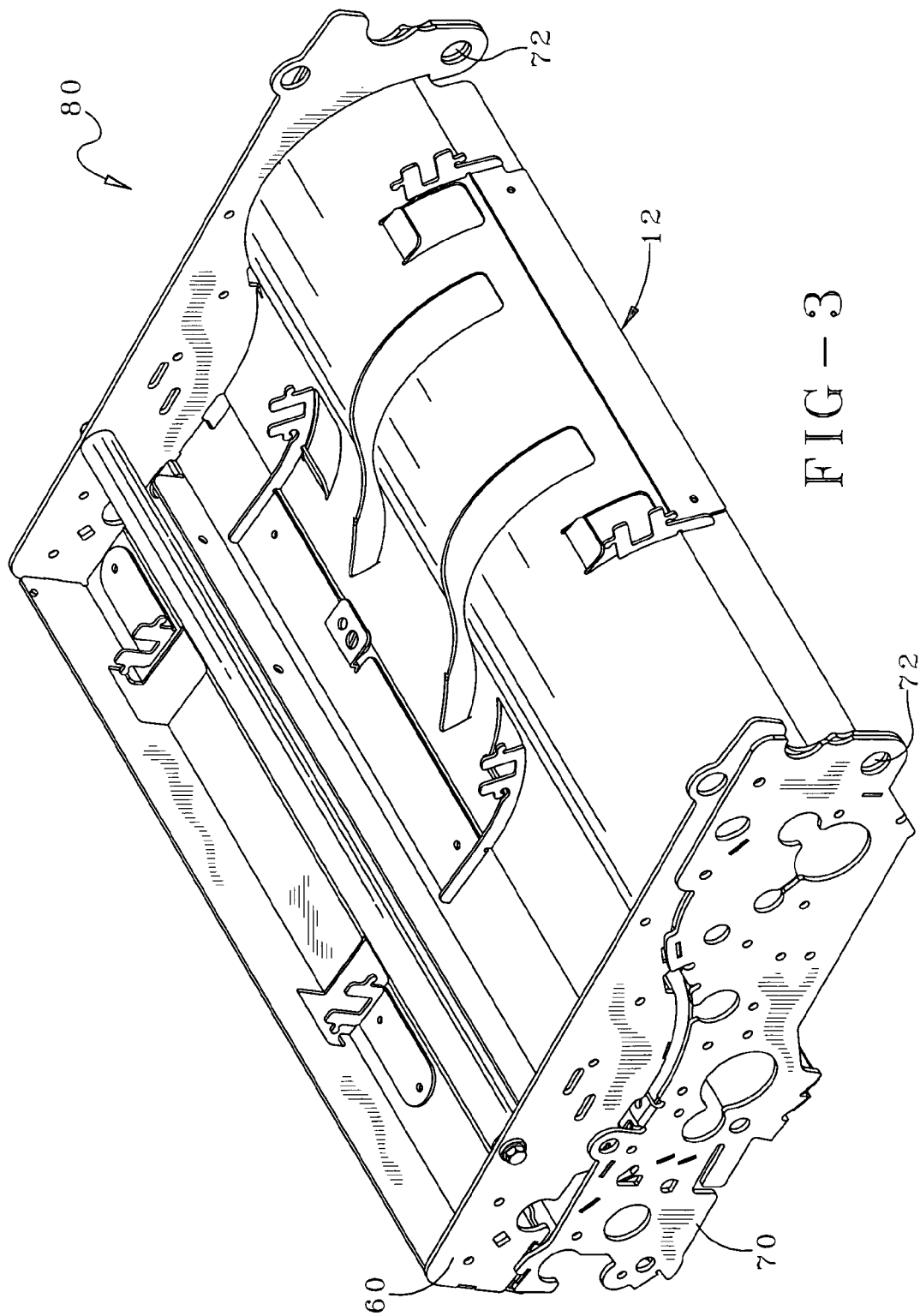
FIG. 3 is an isometric view of a paper path assembly in which the dual spring tensioner may be implemented according to an aspect of the invention.
Figure 4:
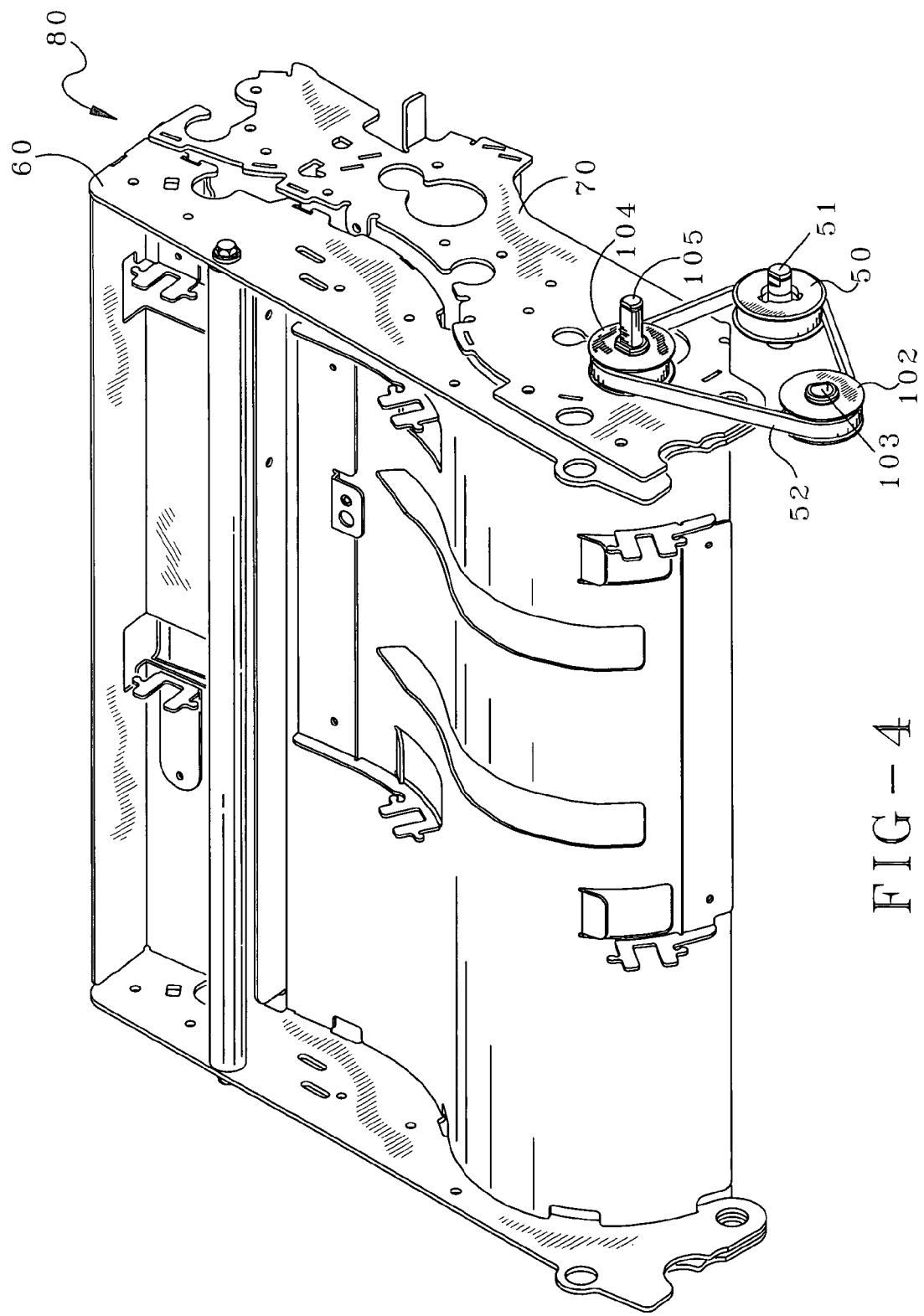
FIG. 4 is an isometric view of the dual spring tensioner of FIG. 1, according to an aspect of the invention, applied to the paper path assembly of FIG. 3.
Figure 5:
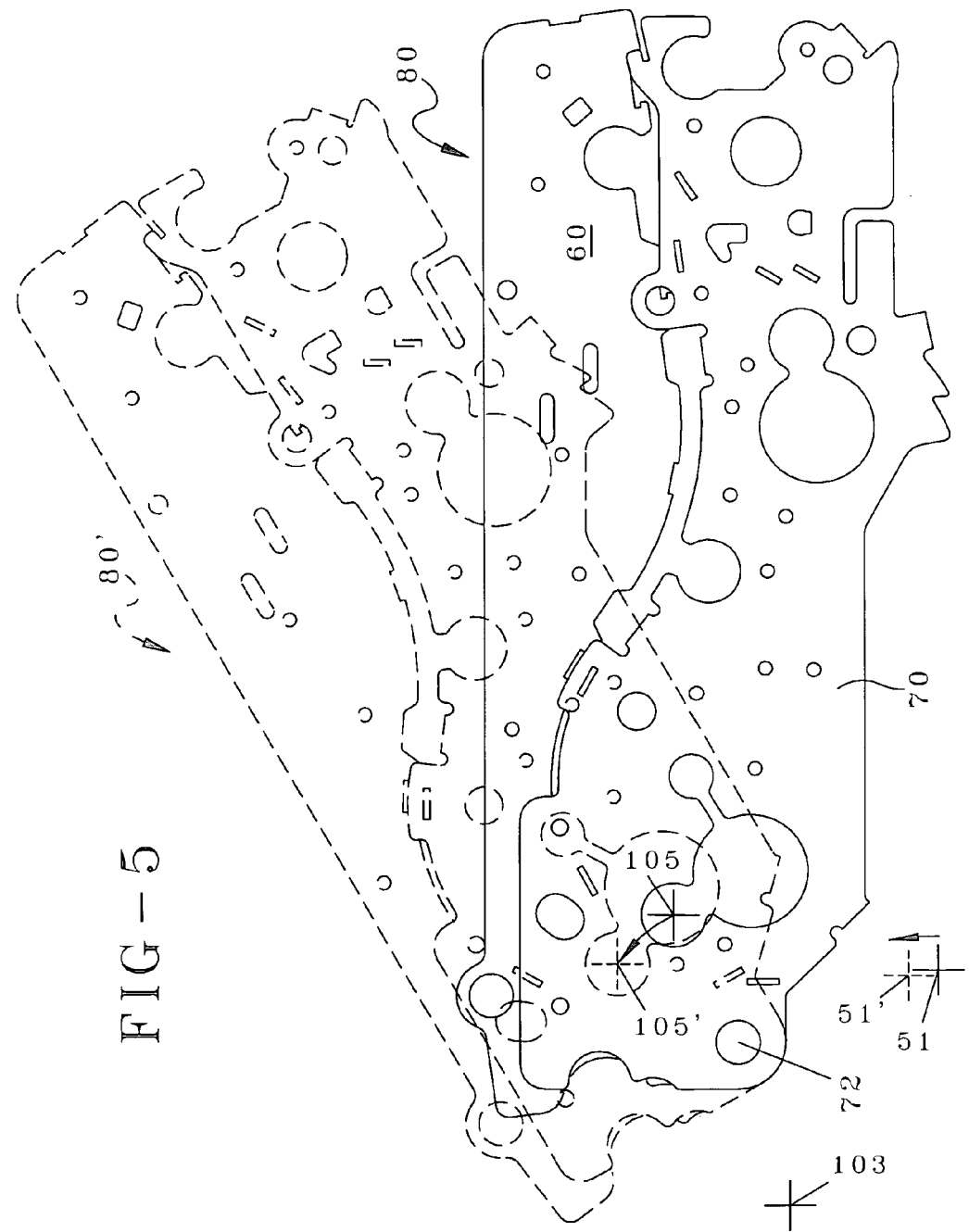
FIG. 5 is a side view of the paper path assembly of FIG. 3 shown in two alternate positions, and showing the axes of rotation for the pulleys of the dual spring tensioner of FIG. 1 in both positions, according to an aspect of the invention.

Referring now to FIGS. 3–5, an application is presented wherein the tensioner 100 is applied to a paper path assembly 80, for example a turn-over assembly for an optical digital scanner. A turnover assembly may be implemented to reverse a sheet in order to scan an opposite side of the sheet, as is well known in the art. The paper path assembly 80 comprises an upper unit 60, and a lower unit 70. The lower unit 70 is pivotally attached to the machine, represented in the drawings by a machine frame 2 (FIG. 2), for example a scanner, at mounting points 72. An isometric view of the tensioner 100 applied to the paper path assembly 80 is presented in FIG. 4.

Referring now to FIG. 5, a side view of the paper path assembly 80 is presented with the pulley axes of rotation 51, 103, and 105. A representation 80' of the paper path assembly 80 rotated from its normal position is shown in phantom. Rotating the paper path assembly 80 around the mounting points 72 causes the pulley axes of rotation 103 (and the pulley 102) to move to a position 103', as indicated by the arrow. It also causes the pulley axis of rotation 105 (and the pulley 104) to move to a position 105', as indicated by the arrow. Note that the pulley axis of rotation 51 (and pulley 50) do not move since the pulley 50 is mounted directly to the machine. In a preferred embodiment, an immobile pulley is implemented as the drive pulley driven by a motor, or other desired drive device.

According to a further aspect of the invention, the position of the stop 30 is adjustable. This allows for greater tolerances during the manufacturing process. According to one aspect of the invention, the stop 30 has a slot 32 and is attached to the machine by a fastener 34 through the slot 32. In this case, the position of the stop 30 in relation to the pivot arm 40 may be adjusted as the slot allows. Although the invention is not limited to a particular type of fastener, the fastener is preferably removable, such as a screw or bolt.

In a further embodiment of the invention, the pivot arm 40 has an end one 46 and an opposing end two wherein the tensioner spring 10 and the retainer spring 20 are attached to the pivot arm 40 on the pivot arm end one 46 and the pulley 50 is attached to the pivot arm 40 at the pivot arm end two 44.

Although described with reference to an articulating paper path assembly 80, the invention has equal utility with other articulating designs having an articulating member with a pulley mounted thereon that engages a flexible drive member, and all such variations are considered to fall within the purview of the invention.

According to another aspect of the invention, a method for applying and maintaining tension on a drive belt in a machine using a flexible drive member is provided, comprises mounting a pulley 50 onto a pivot arm 40, placing the flexible drive member 52 around the pulley 50, mounting and deflecting a tensioner spring 10 between the pivot arm 40 and the machine, represented in the drawings by a machine frame 2, mounting a stop 30 to the machine in contact with the pivot arm 40, and mounting a retainer spring 20 between the pivot arm 40 and the machine. The pivot arm 40 has an axis of rotation 42 about which the pivot arm 40 is free to pivot, wherein the pivot arm 40 is mounted to the machine at the axis of rotation 42. According to a preferred embodiment, mounting the retainer spring 20 includes deflecting the retainer spring 20 to develop a force sufficient to maintain the pivot arm 40 in contact with said stop 30 during torque impulses According to a further aspect of the invention, the tensioner spring 10 has an end one 12 and an end two 14 and the tensioner spring end one 12 is mounted to the machine, represented in the drawings by a machine frame 2, and the tensioner spring end two 14 is mounted to the pivot arm 40. Subsequent to mounting the tensioner spring 10, the pivot arm 40 reaches an equilibrium with the force applied to the pulley 50 by the flexible drive member 52. The stop 30 is then mounted to the machine such that when it is in contact with the pivot arm 40, the stop 30 touches the pivot arm 40 but applies minimal force, preferably no force, to it prior to installation of the retainer spring 20. After the stop 30 is in place, the retainer spring 20 is mounted between the machine and the pivot arm 40, wherein the retainer spring 20 has an end one 22 and an end two 24, and wherein the retainer spring end one 22 is attached to the machine, and the retainer spring end two 24 is attached to the pivot arm 40.

As is apparent from the description provided herein, a method and apparatus for tensioning a flexible drive member 52 in a machine, represented in the drawings by a machine frame 2, are provided, comprising tensioning the flexible drive member 52 with a pivot arm 40 having a pulley 50 engaged with the flexible drive member 52 and a tensioner spring 10, prohibiting the pivot arm 40 from rotating in a direction that increases tension in the flexible drive member 52 while allowing the pivot arm 40 to rotate in a direction that decreases tension in the flexible drive member 52, and resiliently restraining the pivot arm 40 from rotating in the direction that decreases tension in the flexible drive member 52 with a retainer spring 20. According to a preferred embodiment, the method and apparatus comprises restraining the pivot arm 40 with a force sufficient to prevent movement of the pivot arm 40 during torque impulses.

Although the invention has been described and illustrated with reference to specific illustrative embodiments thereof, it is not intended that the invention be limited to those illustrative embodiments. Those skilled in the art will recognize that variations and modifications can be made without departing from the true scope and spirit of the invention as defined by the claims that follow. It is therefore intended to include within the invention all such variations and modifications as fall within the scope of the appended claims and equivalents thereof.

What is claimed is:

1. A dual spring tensioner for a flexible drive member in a machine having a machine frame, comprising:
   a pivot arm with an axis of rotation about which said pivot arm is free to pivot, wherein said pivot arm is mounted to the machine frame at said axis of rotation wherein said pivot arm has opposing ends end one and end two;
   a tensioner spring having an end one attachable to the machine frame and an end two attached to said pivot arm;
   a pulley cooperable with the flexible drive member and mounted to said pivot arm;
   a retainer spring having an end one attachable to the machine frame and an end two attached to said pivot arm and wherein said tensioner spring and said retainer spring, laterally spaced from each other, are attached to said pivot arm on said pivot arm end one and said pulley is attached to said pivot arm at said pivot arm end two, and;
   a stop attachable to the machine frame that counters force applied to said pivot arm by said tensioner spring and said retainer spring, wherein tension in the flexible drive member is set by said tensioner spring and said stop.

2. The dual spring tensioner of claim 1 wherein the position of said stop is adjustable.

3. The dual spring tensioner of claim 1 wherein said stop has a slot and wherein said stop is attached to the machine by a fastener through said slot, and wherein the position of said stop in relation to said pivot arm is adjustable.

4. The dual spring tensioner of claim 1 wherein the spring constant of said retainer spring is sufficient to prevent movement of said pivot arm under torque impulses.

5. The apparatus of claim 1 wherein said machine is a reproduction device.

6. The apparatus of claim 1 wherein said machine is an optical digital scanner.

7. The apparatus of claim 1 further comprising an articulating member with a pulley mounted thereon that engages said flexible drive member.

8. The apparatus of claim 7, wherein said machine is an optical digital scanner and said articulating member is a turnover assembly.

* * * * *